United States Patent
Campagnolo et al.

(10) Patent No.: US 7,121,968 B2
(45) Date of Patent: Oct. 17, 2006

(54) PROCESS FOR CONTROLLING GEAR SHIFTING IN A CYCLE, AND CORRESPONDING SYSTEMS AND COMPONENTS

(75) Inventors: Valentino Campagnolo, Vicenza (IT); Gianfranco Guderzo, Tezze-Arzignano (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 11/138,815

(22) Filed: May 26, 2005

(65) Prior Publication Data

US 2005/0233849 A1    Oct. 20, 2005

Related U.S. Application Data

(63) Continuation of application No. 10/690,042, filed on Oct. 21, 2003, which is a continuation of application No. 09/820,360, filed on Mar. 29, 2001, now Pat. No. 6,634,971.

(30) Foreign Application Priority Data

Mar. 29, 2000    (IT) ................ TO2000A0292

(51) Int. Cl.
*F16H 61/00*    (2006.01)
(52) U.S. Cl. ...................................... 474/80
(58) Field of Classification Search .................. 474/78, 474/79, 80, 82, 83; 280/260, 261; 701/51, 701/52

See application file for complete search history.

(56) References Cited

U.S. PATENT DOCUMENTS

| | | | |
|---|---|---|---|
| 3,919,891 A | 11/1975 | Stuhimiller et al. | |
| 4,780,864 A | 10/1988 | Houlihan | |
| 5,059,158 A | 10/1991 | Bellio et al. | |
| 5,205,794 A | 4/1993 | Browning et al. | |
| 5,213,548 A | 5/1993 | Colbert et al. | |
| 5,231,872 A | 8/1993 | Bowler et al. | |
| 5,261,858 A | 11/1993 | Browning | |
| 5,266,065 A | 11/1993 | Ancarani Restelli | |
| 5,335,540 A | 8/1994 | Bowler et al. | |
| 5,435,315 A | 7/1995 | McPhee et al. | |
| 5,483,137 A | 1/1996 | Fey et al. | |
| 5,527,239 A | 6/1996 | Abbondanza | |
| 5,571,056 A | 11/1996 | Gilbert | |
| 5,738,603 A | 4/1998 | Schmidt et al. | |
| 5,759,124 A | 6/1998 | Sung | |
| 6,132,327 A | 10/2000 | Campagnolo | |
| 6,199,021 B1 * | 3/2001 | Cote et al. | 702/44 |

(Continued)

FOREIGN PATENT DOCUMENTS

DE    3445617 A1    7/1985

(Continued)

*Primary Examiner*—Vicky A. Johnson
(74) *Attorney, Agent, or Firm*—Volpe and Koenig, P.C.

(57) ABSTRACT

A system for controlling gear shifting in a transmission of a cycle, includes at least one gear wheel or sprocket on which a transmission element is engaged to perform transmission of motion as a result of movement in a predetermined direction. The gear shifting is carried out by changing the position of engagement of the transmission member with respect to the at least one gear wheel or sprocket. The system further includes at least one sensor for detecting the movement in corresponding direction of movement of the motion transmitting element for generating a signal and a control unit for controlling the change of the position of the element for transmitting motion with respect to the at least one gear wheel or sprocket when the signal indicates that the element for transmitting motion is moving in the given direction.

4 Claims, 5 Drawing Sheets

U.S. PATENT DOCUMENTS 6,676,549 B1 * 1/2004 Fukuda .................. 474/102

FOREIGN PATENT DOCUMENTS

| | | | |
|---|---|---|---|
| DE | 3709587 A | 10/1987 | |
| DE | 4004981 C1 | 5/1991 | |
| DE | 29604853 U1 | 7/1996 | |
| EP | 0048662 A1 | 3/1982 | |
| EP | 0081807 A1 | 6/1983 | |
| EP | 0416325 A2 | 3/1991 | |
| EP | 0820923 A1 | 1/1998 | |
| EP | 0887251 A1 | 12/1998 | |
| EP | 0 909 940 A2 | 4/1999 | |
| FR | 2533025 A1 | 3/1984 | |
| FR | 2654698 | 5/1991 | |
| GB | 2166598 A | 5/1986 | |
| GB | 2188459 A | 9/1987 | |
| GB | 2188489 A | 9/1987 | |
| JP | 57014107 | 8/1983 | |
| JP | 5347649 A | 12/1993 | |
| JP | 5347650 A | 12/1993 | |
| JP | 5347651 A | 12/1993 | |
| TW | 416527 | 3/1988 | |
| TW | 261308 | 10/1995 | |
| WO | 8900401 | 1/1989 | |
| WO | 9214620 A | 9/1992 | |
| WO | 9316891 | 9/1993 | |

\* cited by examiner

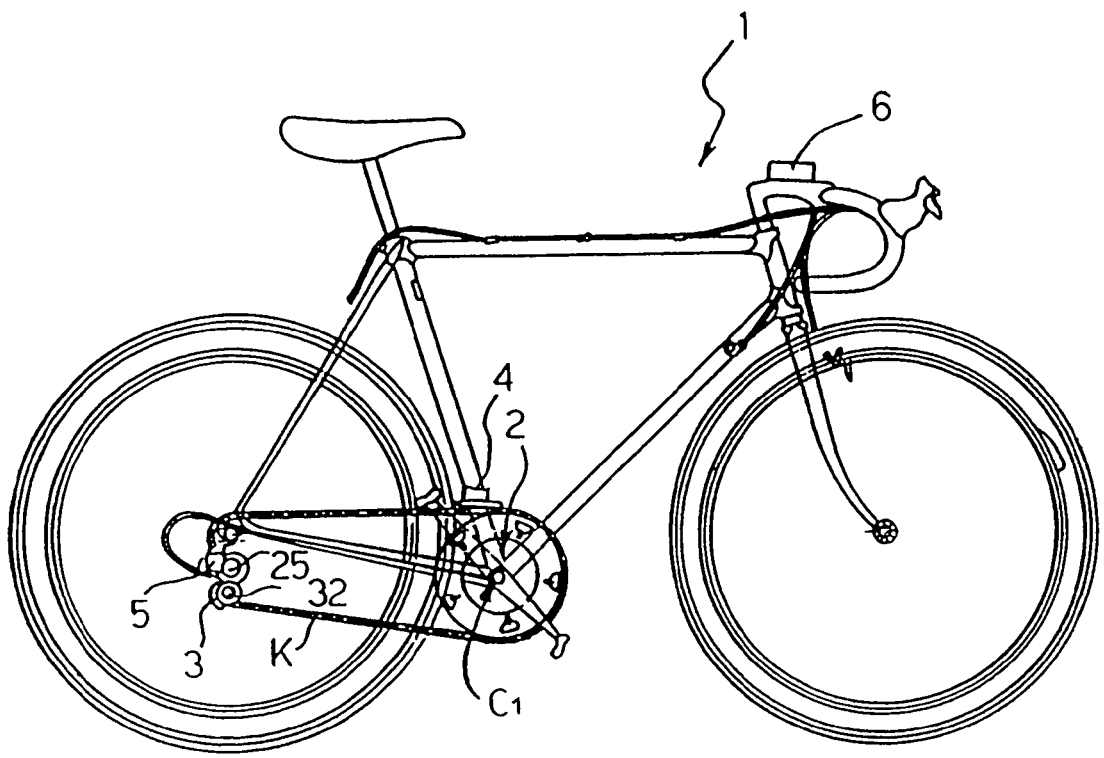
Fig_1
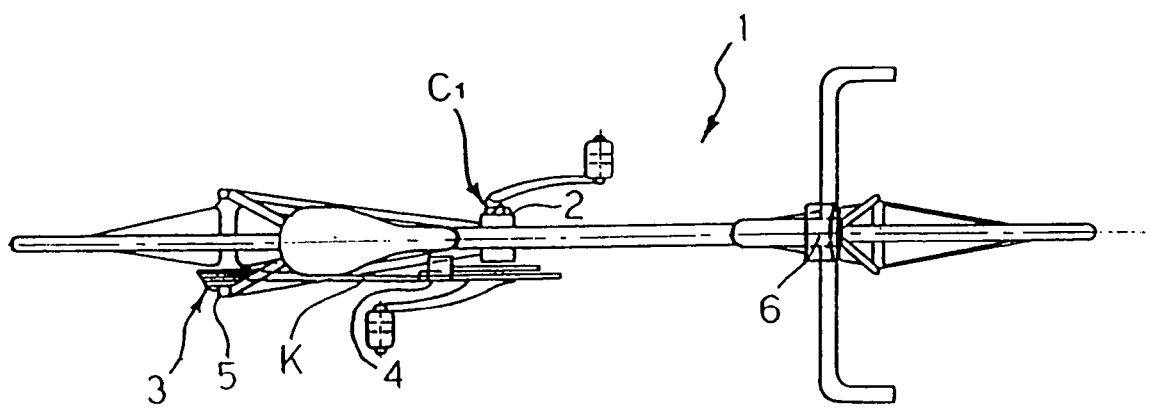
Fig_2

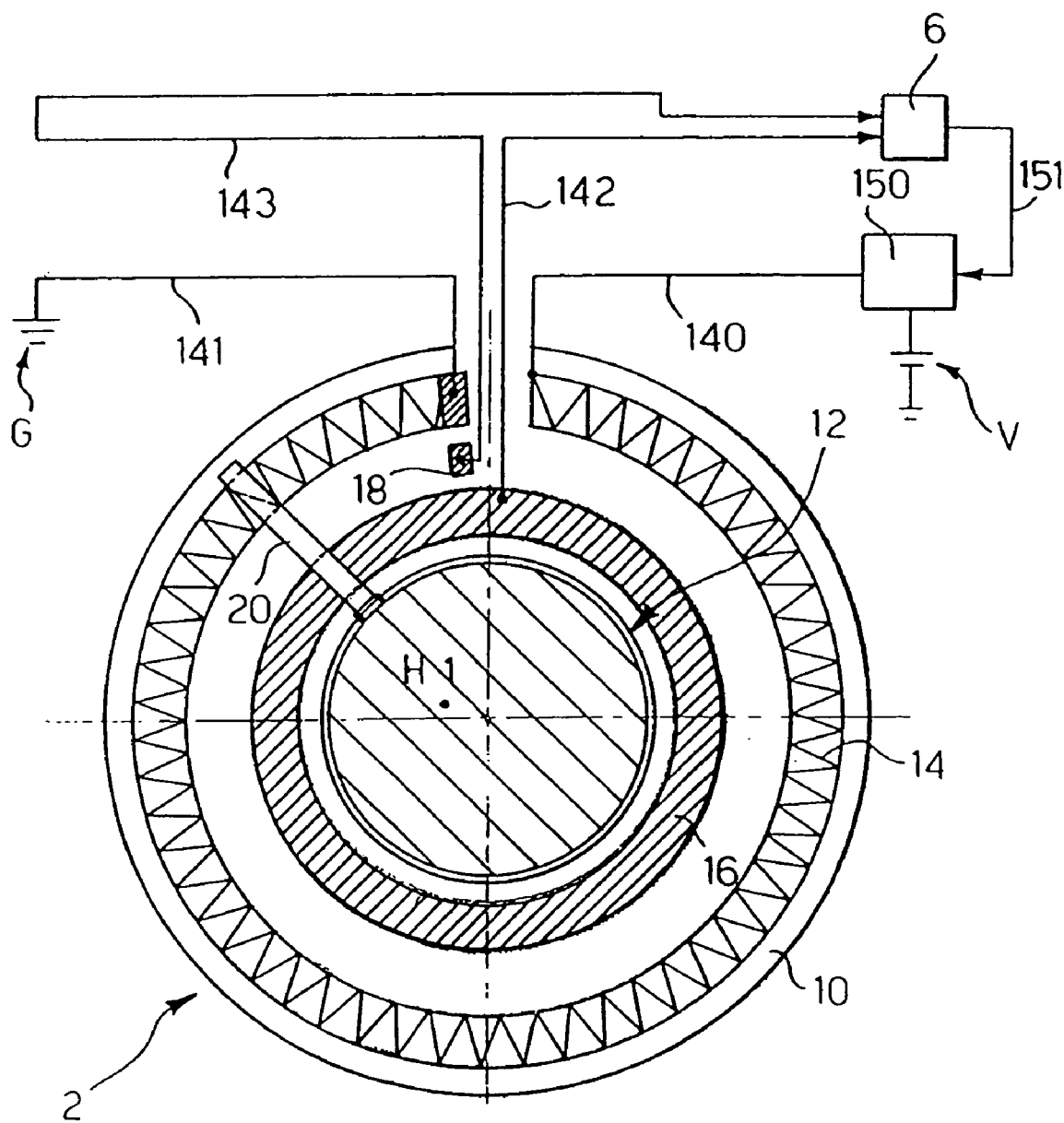
Fig_3

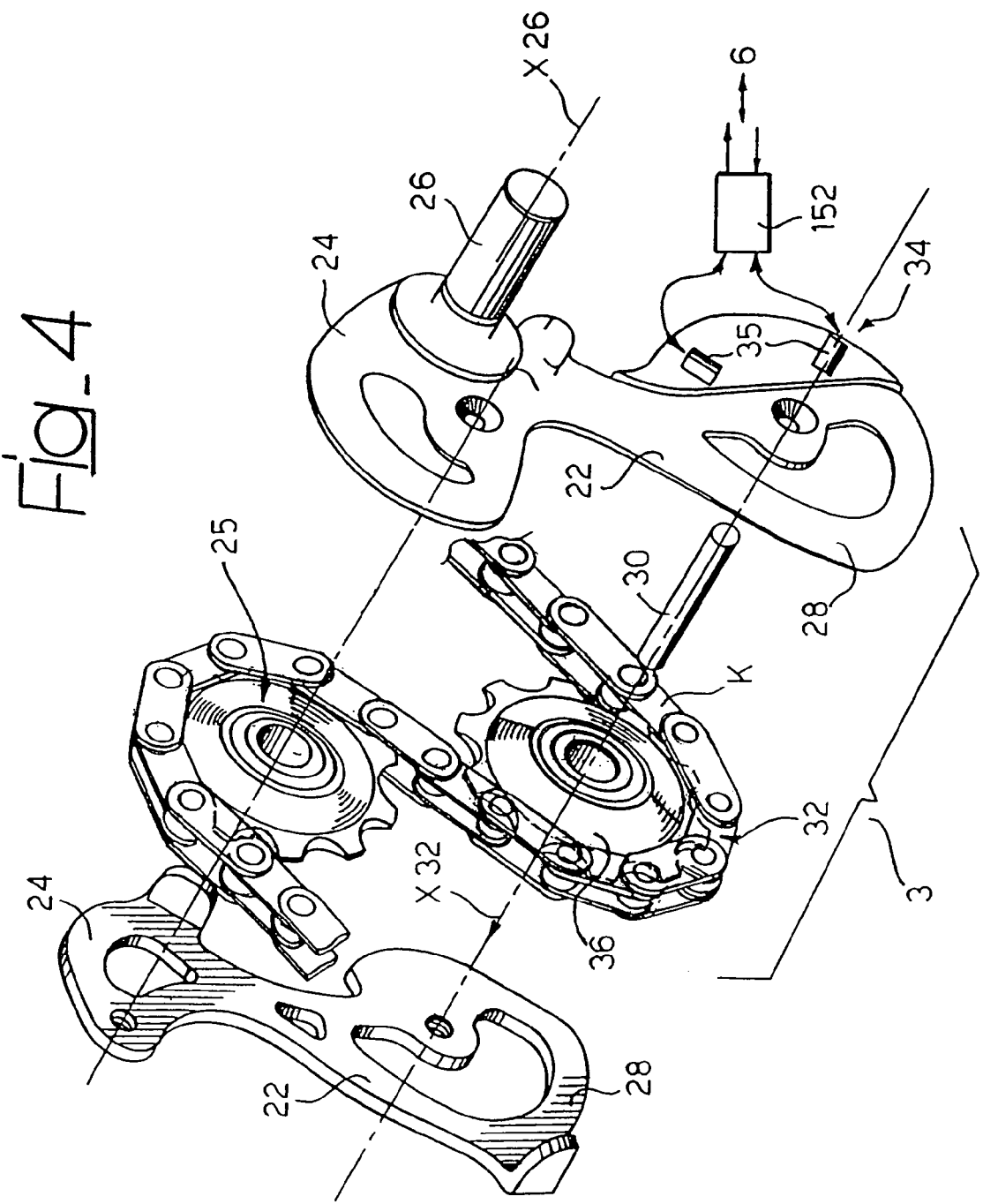
Fig_4

Fig_5
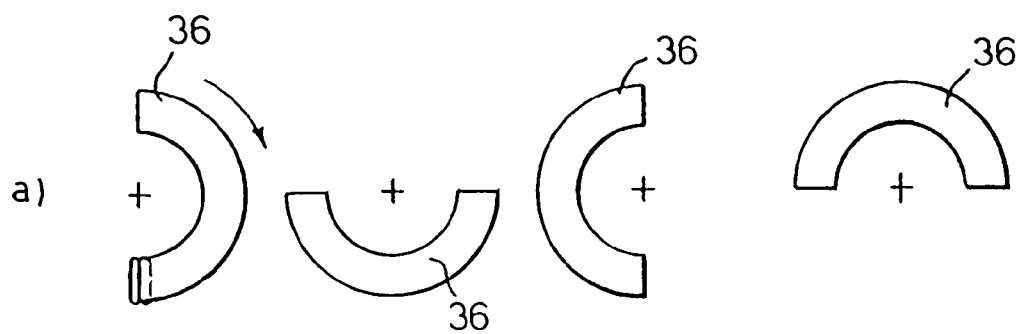
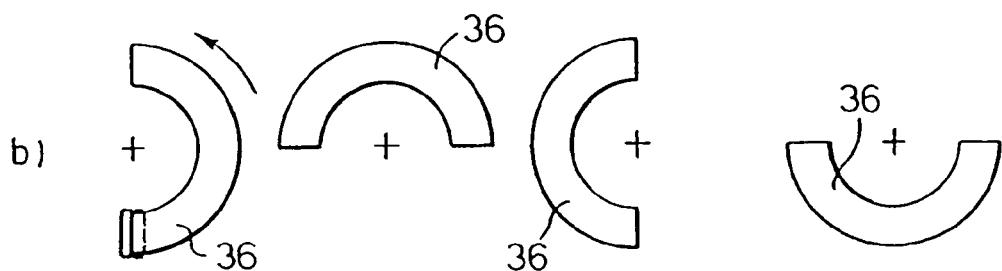
Fig_6
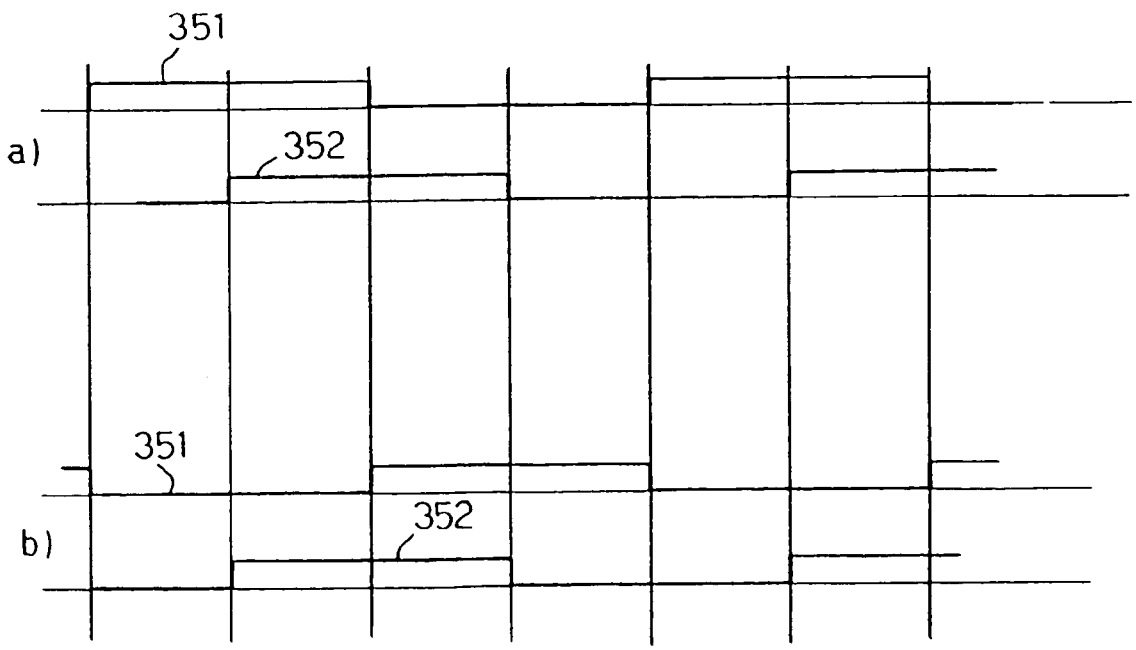

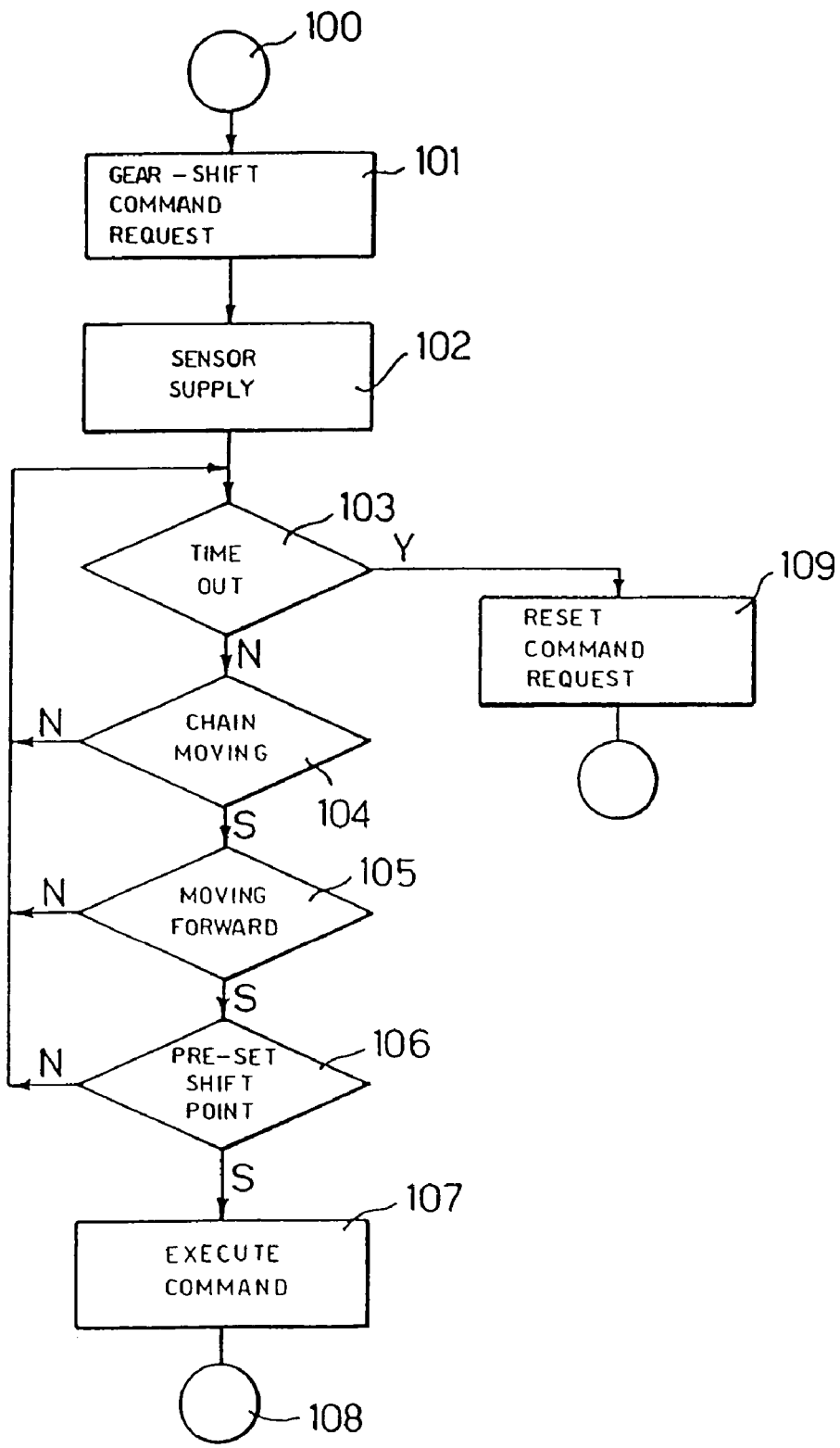
Fig_7

PROCESS FOR CONTROLLING GEAR SHIFTING IN A CYCLE, AND CORRESPONDING SYSTEMS AND COMPONENTS

CROSS REFERENCE TO RELATED APPLICATIONS

This application is a continuation of U.S. patent application Ser. No. 10/690,042 filed Oct. 21, 2003, which claims the benefit of U.S. Pat. No. 6,634,971, both of which are incorporated by reference as if fully set forth.

The present invention tackle the problem of controlling gear shifting in cycles and has been developed with particular attention paid to the possible application to competition bicycles. In any case, the reference to this possible application, and in particular the reference to the application to racing bicycles, must not be interpreted as limiting the possible field of application of the invention.

Over the last few years there has developed, in the cycle sector, the tendency to associate to the cycle sensors of various nature so as to be able to acquire information of various kinds regarding the use/behaviour of the means, the aim being to be able to intervene through actuators to modify—according to certain criteria, and acting both in an automatic way and according to specific commands issued by the user ? the conditions of use/behaviour of the means, in particular as regards its set.

In particular, the present invention has been developed with specific reference to the servo systems which carry out positioning of the transmission chain of the cycle in a position corresponding to the front derailleur and to the rear derailleur.

In drive trains mounted on cycles of a more sophisticated type it is envisaged that the toothing of the crankwheel and sprockets on which the derailleurs act are not all made up of teeth that are the same. Instead, the teeth are arranged in ordered sets and the teeth comprised within each set have a sequence of differentiated geometries such as to facilitate shifting of the chain, the foregoing in order to create, within the corresponding toothing, points or areas in which the movement of shifting of the chain is facilitated. Said points or areas are referred to simply as "facilitating portions".

If a command for shifting of the chain position is issued at an inopportune moment, the correct positioning of the chain may be at least momentarily hindered, and hence delayed.

This drawback, which is anyway noticeable in systems for control of gear-shifting of a manual type, becomes particularly troublesome in cycles in which the change of transmission ratio is controlled by an automatically operated actuator, which is governed by an electronic control system. Such a system is usually configured to co-ordinate the various interventions of modification of set of the cycle itself (both according to the commands issued by the user and in an altogether automatic way), so as to optimize the performance of the cycle and, more in general, of the cycle-user system.

As is recognized, for example, in the European patent application EP-A-1 010 612 (on the other hand published after the date of priority of the present application), in the framework of these systems, the attempt to control shifting of the chain at a wrong moment may give rise to various problems.

For example, in addition to an undesired retardation in actuation of the command, a problem may arise linked to the fact that the actuator involved by the command ends up being activated (and hence absorbing energy) for an interval of time in which the actuator itself is not able to ensure that the action requested will be carried out During this interval, the actuator absorbs power from supply sources (typically batteries) mounted on the cycle, this amounting to energy which, to all effects, ends up being wasted without obtaining any useful result.

The aim of the present invention is to provide a solution that is able to overcome the drawbacks outlined above.

According to the present invention, this purpose is achieved thanks to a process having the characteristics specifically called for in the claims which follow.

The invention also relates to the corresponding system, as well as to components usable in the context of the aforesaid system and/or for implementation of the aforesaid process.

Basically, the solution according to the invention is along the lines of innovation that have led to an increasing sophistication in the control systems usable on cycles, and in particular on competition bicycles, with the aim of acquiring information that may be used for optimizing the supply of energy, avoiding the waste that occurs in systems designed usually to be supplied via batteries, with the evident need to prevent the cycle from being rendered heavy by batteries that are too cumbersome and/or weigh too much.

In a preferred embodiment, the solution according to the invention involves using a transducer that may be positioned in alignment with the crank axle of the cycle. This is preferably a transducer of a potentiometric type, capable of detecting information, such as:

movement of the transmission element of the cycle (whether this is a chain or a belt);

the corresponding direction of movement;

the angular position (or "phase") of the corresponding toothing of the gear wheel driven by the crank axle of the cycle; and the pedal cadence This information may be, at least in part, used to condition activation of members of the cycle moved by means of actuators which draw energy from power-supply sources, such as batteries mounted on the cycle itself.

This applies in particular as regards the operation of the front and/or rear derailleur in order to obtain carrying-out of the shifting operation at the most favourable moment, i.e., when the chain is in a position that exactly corresponds to one of the "facilitating portions" referred to in the introductory part of the present description.

In this connection, it should be noted that shifting of the chain, or more in general of the element for transmitting motion, may take place properly only if the element itself is moving; otherwise, there is the risk of causing waste of energy and undesirable stresses on the mechanical parts.

A pure and simple signal of movement is not, however, sufficient, given that, if the chain moves in a direction opposite to the desired one (i.e., in the direction opposite to the direction of pedalling to make the cycle advance), again an undesired result is obtained.

Consequently, the solution according to the invention in general involves performance of the operation of gear shifting according to whether it is recognized that the chain itself is moving, and in the desired direction (i.e., in the same direction as that of pedalling to make the cycle advance), as well as to whether the gear wheel involved in gear shifting is in a given angular position (in turn corresponding to the location of the chain in a position that corresponds to one of the aforesaid facilitating portions).

The invention will now be described, purely by way of non-limiting example, with reference to the attached drawings, in which:

FIG. 1 is a side elevation of a cycle, such as a competition bicycle, equipped with a system according to the invention;

FIG. 2 is a top view of the cycle represented in FIG. 1;

FIG. 3 is a schematic view illustrating, as a whole, the structure of a sensor that may be mounted on the cycle represented in FIGS. 1 and 2;

FIG. 4 illustrates the structure of another sensor that may be mounted on the aforesaid cycle;

FIGS. 5 and 6, each of which comprises two parts designated by a) and b), illustrate in greater detail the criteria of operation of the sensor of FIG. 4; and FIG. 7 is a flowchart illustrating a possible example of implementation of the process according to the invention In the attached drawings, the reference number 1 designates, as a whole, a cycle, such as a competition bicycle, for example a racing bicycle The structural and constructional characteristics of such a cycle are to be deemed altogether known, and hence such as not to require a detailed description herein In this connection, persons skilled in the sector will appreciate that the possibilities of use of the solution according to the invention are certainly not limited to the type of cycle illustrated In the currently preferred embodiment of the invention, the use is envisaged of a sensor 2 located in a position corresponding to the crank axle C1. In embodiments of the invention considered less preferred, it is possible to envisage the use (either together with or as an alternative to the sensor 2) of a second sensor 3 located in a position corresponding to the chain-tensioner.

The fact that in the drawings of FIGS. 1 and 2 the possible co-presence of the sensors 2 and 3 is illustrated is therefore due solely to the aim of not rendering the present description needlessly burdensome.

The system further comprises two actuators, designated by 4 and 5, designed to control, respectively, the front derailleur and the rear derailleur of the cycle.

Both the sensors 2 and/or 3 and the actuators 4, 5 are connected, for example by means of respective communication lines (not visible in the drawings, but of a known type), to a processing unit 6 located preferably, at least in part, in the vicinity of the handlebars of the cycle.

In its process and system aspects, the invention regards the modalities according to which the action of change of transmission ratio of the cycle is performed.

In a further aspect, the invention regards preferred solutions for obtaining the sensors 2 and 3.

In any case, at least in its process and system aspects, the solution according to the invention is irrespective both of the specific characteristics of the sensors 2 and 3 and of the specific characteristics of the actuators 4 and 5.

Passing now to a detailed examination of the structure of the sensor 2 (FIG. 3), it may be noted that it basically comprises a stator element 10, which includes for example a small disk made of electrically insulating material designed to be mounted in a fixed position with respect to the frame of the cycle 1. In particular, the element 10 has a central opening 12 through which it is possible to extend the crankpin H1 of the crank axle C1 of the cycle.

Provided on the element 10 are two concentric circular channels on strips 14 and 16, respectively outer and inner, both of which are electrically conductive, and at least one of which (for example, the strip 14, in the example illustrated) is made of electrically resistive material.

The two ends of the strip 14 terminate in two end pins, designated by 140 and 141, which may be connected respectively:

to a power-supply source V (it may, for instance, be one of the power-supply batteries provided, in a known way, on the cycle), and to a ground terminal G.

Connection of the pin 140 to the power source V is preferably by means of an electronic switch 150, the function of which will be better explained in what follows.

The inner strip 16, which is here supposed as being simply a strip, made of metal material, is connected to a further pin 142, which may in turn be connected to the processing unit 6.

Also connected to the same processing unit 6 is a further pin 143, which is in turn connected to a pad 18 made of electrically conductive material, the said pad being set between the strips 14 and 16 at a point corresponding to one of the ends of the strip 14 itself.

Finally, the reference number 20 designates a rotating brush, made of electrically conductive material, mounted on a rotating member, which may be driven in rotation by the crankpin H1.

The set of parts described basically defines a voltage divider of a resistive type, in which, once the value of the supply voltage V applied to the pin 140 has been set, the level of voltage detectable on the pin 142 basically depends upon the angular position of the brush 20, and hence upon the angular position of the crankpin H1.

By sliding on both of the strips 14 and 16, the brush 20 establishes an electrical connection between the strip 16 (which here is assumed as having a continuous circular development and being made of electrically conductive material) and the strip 14 (here configured as an open ring, with the two ends that are connected to the pins 140 and 141 being adjacent but not connected to one another).

With every turn of the crankpin H1 of the bottom bracket, the pad 18 and the pin 143 connected to it are short-circuited, for example towards the pin 141 and/or the end of the strip 14 connected thereto, so as to force the pin 143 to the ground voltage.

The output signal of the sensor 2 is basically a sawtooth signal, which assumes a maximum value when the crankpin H1 is in the angular position corresponding to the location of the brush 20 at the end of the channel 14 corresponding to the pin 140, and a minimum value (virtually, zero) when the crankpin H1 localizes the brush 20 at the opposite end of the channel 14, i.e., at a point corresponding to the pin 141.

The fact that the aforesaid sawtooth signal has an inclined rising edge or an inclined falling edge evidently depends, given the same position of installation of the sensor 2, upon the direction of rotation imparted to the crank axle, and hence to the chain K.

In any case, with an appropriate operation of threshold-setting (carried out directly on the analog signal present on the pin 142, or else on the numeric version obtained following upon an analog-to-digital conversion in the transmission/acquisition phase by the unit 6), it is possible to identify precisely whether the gear wheel to which the sensor is associated (in the example of embodiment here illustrated, the wheel moved by the crank axle) is in one of the angular positions corresponding to the location of the chain K at one of the facilitating portions, i.e., at the start of the sequence of teeth that facilitate the shifting that it is intended to impart on the chain K.

In addition, again depending upon the aforesaid operation of threshold-setting, the unit 6 is able to verify that the output signal of the sensor 2 varies in time, an indication of the fact that the corresponding gear wheel and the chain K drawn along by it are moving. Finally, detection of the slope (angular coefficient) of the leading and/or trailing edges of the signal in question enables the unit 6 to identify the direction of movement (forwards or backwards) of the chain K itself.

The set of parts described may be made in the form of an electromechanical component basically resembling a normal rotating potentiometer, with the possibility of inserting the corresponding component inside a shell or, in any case, in a protective structure (for example, in a so-called "potting box"), so as to enable proper operation even in a hostile environment, as is required by its envisaged installation in a position corresponding to the crank axle of a cycle.

Persons skilled in the sector will, on the other hand, appreciate that the exemplary embodiment illustrated (which corresponds to an embodiment that is currently preferred) can undergo numerous variations, such as:

reversal of the role of the strips 14 and 16 (i.e., with the strip 14 made altogether of a conductive material, and the strip 16 made of a resistive material);

kinematic reversal of the roles of the brush 20 and of at least one of the strips 14 and 16, namely, with the brush 20 mounted in a stationary position and with one of the strips that rotates together with the crankpin H1 of the crank axle; or location of the pad 18 in a position corresponding to the end of the strip 14 connected to the pin 140; in this case, the passage of the brush 20 in front of the pad 18 causes the pin 143 to be forced no longer to the ground voltage but to the battery voltage V.

Yet further variant embodiments are evidently within the reach of a person skilled in the sector, without prejudice to the possibility of making a sensor of a potentiometric type that is able to supply at output (on the pin 142, in the exemplary embodiment illustrated) a first signal which uniquely identifies the angular position currently reached by the crankpin H1 of the crank axle, with the further possibility of generating a reference signal which indicates passage of the crankpin H1 through a pre-determined angular position, as well as signals identifying movement and direction of movement of the chain K.

The sensor 3 is, instead, made in such a way as to be located in a position corresponding to the chain-tensioner normally provided in a position corresponding to the rear end of the chain K of the cycle.

The chain-tensioner in question is usually made up of a pair of oscillating arms or half-cages 22 provided with respective upper ends 24 designed to be connected together at a point corresponding to a cage articulation pin or pivot 26, which enables their installation on the frame of the cycle 1 with the possibility of oscillation about a pivot axis X26 extending in the horizontal direction.

Mounted between the aforesaid upper ends, in such a way that it can turn about its own axis X25, is a first top pulley or roller 25, usually having a lenticular profile.

The arms or half-cages 22 then have respective bottom ends 28 designed to be connected together by means of a pivot 30, on which there is mounted, in such a way that it can turn about its own axis X32, a bottom pulley or roller 32 (usually having a lenticular profile).

The chain K of the cycle is mounted in such a way as to engage on the top and bottom rollers 25 and 32 so that it describes a general S-shaped path.

The possible movement of oscillation (in practice, of swinging) of the arms 22 about the axis X26 causes a corresponding movement of the bottom pulley or roller 32, with the result that the latter is able to keep the chain K tensioned, absorbing and compensating the variations in the path of movement of the chain K induced by the fact that the chain itself engages in different positions corresponding to the sprockets of the transmission of the cycle.

In any case, the set of parts that has just been described and the corresponding criteria of operation correspond to solutions which are of themselves amply known, and which consequently do not require any detailed illustration herein, also because they are in themselves irrelevant for the purposes of implementation and understanding of the invention.

The invention envisages in fact configuring at least one of the rollers 25, 32 (in the example of embodiment illustrated, the roller 32) as the rotor part of a sensor, the stator part of which, designated, as a whole by 34, is mounted on one of the arms or half-cages 22.

In the case in point, there is applied, on the roller 32 (possibly by integration at the fabrication-process level, for example by means of co-moulding), an element 36 of magnetic material (such as plastoferrite) having, in the example here illustrated, a general C-shaped conformation with a pre-determined angular extension, such as an angular extension of 180°.

The stator part 34 of the sensor preferably comprises two end instruments or pickups 35, such as two Hall-effect sensors, or reed relays, mounted on a corresponding arm or half-cage 22 in angular positions staggered by 90° with respect to the axis of rotation X32 of the roller 32.

FIG. 5 illustrates, in its two parts set one above the other and designated by a) and b), a possible sequence of rotation of the element 36 within a single turn of the roller 32, according to whether the roller 32 in question is moving (as viewed in FIG. 5) in a clockwise direction (FIG. 5a) or in a counter-clockwise direction (FIG. 5b).

With reference to the direction of movement of the chain K, which engages on the roller 32, the aforesaid two directions of rotation may be considered as corresponding, respectively, to the forward movement and to the backward movement of the chain K itself.

It will be recalled that, as used within the present description, the term "forward" indicates the direction of movement of the chain corresponding to the direction of movement imparted on the chain K when the crank axle of the cycle is driven in the direction that produces forward movement of the cycle itself.

Likewise, the two parts a) and b) of FIG. 6 represent two timing diagrams corresponding to the behaviour of the output signals of the two end instruments or pickups 35—the two signals being designated by 351 and 352, which may be viewed collectively as a second signal—when the chain K moves, respectively, forwards (signals 351 and 352 of FIG. 6a) and backwards (signals 351 and 352 of FIG. 6b).

The aforesaid signals appear intrinsically as logic-type signals (i.e., as signals that present alternately a high logic level and a low logic level according to whether the respective end instrument or pickup 35 is currently passing in front of the magnetic element 36 or is at some distance from it).

Through a logic combination of the signals 351 and 352 generated by the end instruments or pickups 35 it is possible to recognize uniquely whether the movement of the roller 32 (and hence of the chain K) is taking place in one direction or the other. All this takes place according to criteria that are in themselves amply known (for example, from the techniques of use of the so-called "optical encoders"), and consequently does not require any specific illustration herein.

What has been previously said for the sensor 2 also applies to the sensor 3. A person skilled in the sector is in fact able to define, on the basis of the indications provided previously, solutions that are functionally equivalent to the one just described.

In particular, the aforesaid sensing action may be carried out, for example, using the roller 25 instead of the roller 32, or else using sensors or pickups 35 different from the ones described, or, yet again, using two sensors, one of which is associated to one roller and the other to the other roller.

It should, however, be said that, above all from the technological point of view (association to the roller 32 of an element 36 of magnetic material), the solution just described proves particularly advantageous in that it enables a simple, reliable sensor assembly to be obtained, which moreover affords low power consumption and is able to operate properly even in a hostile environment, such as that of the transmission of a cycle.

Again as regards power consumption, it has already been said that there may be associated to the sensor 2 (possibly, by direct integration) an element 150 which has the function of electrical switch able to interrupt connection of the sensor 2 to the voltage source V when activation of the corresponding sensing function is not wanted.

In particular, when the switch 150 is in the open position, the resistive element represented by the strip 14 is not connected to the voltage V, and hence there is no absorption of electrical energy.

The switch 150 is preferably connected to the unit 6 by means of a respective line 151 in such a way as to cause the sensor 2 itself to be in practice activated only when the unit 6 deems it necessary to have available the corresponding signal.

This typically occurs when the unit 6 has available (either because it is received from outside as a result of a positive command issued by the user of the cycle, or because it is processed by the unit 6 itself according to the particular conditions of operation of the cycle) a command aimed at obtaining the change of transmission ratio of the cycle.

A similar arrangement may be provided, at the sensor 3, with a switch 152 which activates the end instruments or pickups 35 only following upon reception of a corresponding activation signal from the unit 6.

The modalities for carrying out the action of front-derailleur shifting will now be described with reference to the embodiment of the invention currently preferred, i.e., assuming that only the sensor 2 is present, which is able to supply a signal that, processed by the unit 6, enables identification both of the angular position of the crank axle of the cycle, and hence of the gear wheel driven by the latter, and movement and direction of movement of the chain K.

At the moment in which the need to carry out a change of front-derailleur gear ratio arises, the unit 6 activates the sensor 2 (for example, by bringing the switch 150, typically represented by an electronic switch, such as a transistor) into a closed position, so as to activate the sensor 2 itself. The corresponding output signal picked up on the pin 142 enables the unit 6 to identify in a unique way the angular position reached by the crankpin H1 of the crank axle, as well as the movement and the direction of movement of the corresponding gear wheel, and hence of the chain K.

The aim of what has been described above is to permit the unit 6 to enable the corresponding actuator (in the example of embodiment illustrated, the actuator 4 associated to the front derailleur) with optimal advance for obtaining the required shifting of the chain properly; it having been detected simultaneously that the chain K is moving forwards, thus preventing the start of any attempt at gear-shifting when the chain is stationary, or else when the chain is moving backwards.

This operating mode is schematically illustrated in the flowchart of FIG. 7.

Here, starting from an initial step 100, the step 101 identifies the reception (or, in any case, processing) by the unit 6 of the request for a chain-positioning command, namely, for gear shifting The next step 102 is the one in which the unit 6 activates the sensor 2 so as to have available the corresponding signal.

After a selection step 103 (the function of which will be illustrated in what follows, and which is here assumed as having the output NO), the signal coming from the sensor 2 undergoes, in a step 104, verification of whether the chain is actually moving.

The output NO from step 104 indicates that the chain K is not moving.

In these conditions, the unit 6 goes back to step 103.

The output YES from step 104, instead, indicates that the chain K is moving, and then, in a subsequent step 105, the unit 6 verifies whether the signal coming from the sensor 2 indicates that the chain K is moving forwards.

The output NO from step 105 causes return to step 103. In the event of output YES from step 106, the unit 6 verifies, in a subsequent step 106, whether the value of the signal of the sensor 2 is such as to indicate that the chain is in a position corresponding to one of shift facilitating portions.

Also in this case, in the event of an output NO, the unit 6 returns to step 103. In the event of an output YES, instead, the unit 6 sends, to the actuator 4, the command for gear shifting (step 107), whilst also deactivating the sensor. It then moves on to a an arrest step 108.

If, for the various reasons specified previously (chain stationary or else moving backwards, location in a position not corresponding to a facilitating portion) there is a return to step 103, the unit 6 verifies whether the time elapsed from the moment in which the unit 6 itself received or processed the gear-shifting command signal is longer than a predetermined threshold value equal to T.

If this interval is shorter than the threshold value (output NO from step 103), the unit 6 repeats the sequence of steps described previously, in order to verify whether, in the meantime, the user has started to pedal again and so to move the chain K forwards, in particular bringing the chain into a position corresponding to one of the facilitating portions, so as to establish indications favourable for gear shifting.

If, instead, the conditions unfavourable for shifting of the chain persist for a certain time interval (output YES from step 103), the unit 6 moves onto a step 109, hence interpreting the gear-shifting command received or processed as a non-executable command, possibly because it has been issued in an erroneous way, and so carries out a reset to clear the gear-shifting command; then it moves on to an end step 110.

In these conditions, for example, the unit 6 will be able to send, to the user, a signal (for example an acoustic and/or light signal) aimed at pointing out the fact that, even though the user has issued a command for gear shifting, he is behaving in a way which is not consistent with the command given (for example, because he is not pedalling or he is pedalling backwards).

It will be appreciated that the criteria of operation described above are implementable, in a sub-optimal way, operating exclusively according to the signal of movement and direction of movement of the chain K, the foregoing being aimed at rendering the execution of the gear-shifting operation uniquely conditional on the fact that the chain K is moving forwards. In this case, evidently the information on the angular positioning of the gear wheel, and hence the information on the positioning of the chain K with respect to the shift facilitating portions, is not available.

Of course, without prejudice to the principle of the invention, the details of construction and the embodiments may vary widely with respect to what is described and illustrated herein, without thereby departing from the scope of the present invention. This applies in particular to the possibility of applying the criteria of operation described above with reference to the gear wheel associated to the crank axle (and hence to the corresponding derailleur) also, or exclusively, to the rear derailleur.

At least in principle, it is also possible to envisage sensing the position of the chain K, in particular the position with respect to the toothing of the gear wheel moved by the crank axle, by exploiting the signal generated by a sensor, such as the sensor 3, associated to the chain-tensioner.

Yet a further possible variant embodiment may envisage use of the sensor 2 for generating the signal of angular position of the gear wheel, and use of the sensor 3 for generating the signal of movement and direction of movement of the chain K. The solution based on the use of the sensor 2 alone proves, however, particularly advantageous in terms of precision and reliability of operation of the system.

What is claimed is:

1. A system for controlling when gear shifting occurs in the transmission of a cycle, the system comprising:

at least one sensor that detects a marker that rotates about an axis parallel to an axis coaxial with a rear hub of a cycle wheel, said marker having angular positions that correspond to no, forward, and rearward movement of a transmission chain;

a control unit for activating said sensor according to a command request; and a shifter that shifts the chain, following the command request, only if the transmission chain moves forward.

2. A system for controlling gear shifting on a bicycle comprising the steps of:

a) detecting a processing signal representative of an affirmative shift command;

b) detecting an angular position of a marker that rotates about an axis parallel to an axis of a hub of a rear wheel in response to the processing signal, said angular position changing with movement of a bicycle transmission element; and c) shifting the bicycle transmission element based on the detected angular position of the marker, only if the transmission element is moving forward;

wherein step (c) is performed only after steps (a) and (b).

3. The system of claim 2, wherein the steps (a)–(c) are repetitively performed.

4. The system of claim 2, wherein the angular position of the marker indicates rotation of said marker, and rotation in a first direction allows step (c) to proceed.

* * * * *